(12) United States Patent
Johansson et al.

(10) Patent No.: US 6,811,126 B2
(45) Date of Patent: Nov. 2, 2004

(54) STRETCH RELEASING ADHESIVE TAPE ARTICLE WITH FLEXIBLE COVER

(75) Inventors: Ronald C. Johansson, Stillwater, MN (US); Michael D. Hamerski, Baldwin Township, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/953,004

(22) Filed: Sep. 13, 2001

(65) Prior Publication Data

US 2003/0047654 A1 Mar. 13, 2003

(51) Int. Cl.[7] .............................................. F16B 47/00
(52) U.S. Cl. .................................................. 248/205.3
(58) Field of Search .......................... 248/205.3, 205.4, 248/683, 902, 316.7, 314, 111

(56) References Cited

U.S. PATENT DOCUMENTS

| 4,024,312 A | | 5/1977 | Korpman |
| 5,409,189 A | | 4/1995 | Lühmann |
| 5,484,066 A | * | 1/1996 | Luisi ........................ 211/69.8 |
| 5,507,464 A | | 4/1996 | Hamerski et al. |
| 5,516,581 A | | 5/1996 | Kreckel et al. |
| 5,967,474 A | | 10/1999 | doCanto et al. |
| 5,989,708 A | | 11/1999 | Kreckel |
| 6,004,642 A | | 12/1999 | Langford |
| 6,075,179 A | * | 6/2000 | McCormack et al. ....... 604/367 |
| 6,082,686 A | | 7/2000 | Schumann |
| 6,106,937 A | | 8/2000 | Hamerski |
| 6,131,864 A | | 10/2000 | Schumann |

FOREIGN PATENT DOCUMENTS

| DE | 33 31 016 A1 | 10/1984 |
| DE | 33 31 016 C2 | 10/1984 |
| DE | 196 32 182 A1 | 2/1998 |
| WO | WO 94/21157 | 9/1994 |
| WO | WO 95/06691 | 3/1995 |
| WO | WO 99/31193 | 6/1999 |
| WO | WO 01/34717 A1 | 5/2001 |

* cited by examiner

Primary Examiner—Ramon O. Ramirez
Assistant Examiner—Kofi Schulterbrandt
(74) Attorney, Agent, or Firm—David B. Patchett

(57) ABSTRACT

An article for use with a stretch releasing adhesive tape strip having a non-adhesive pull tab includes a unitary attachment member having a base plate portion sized to overlay the entire stretch releasing adhesive tape strip. The base plate portion includes a first portion that overlays the adhesive portion of tape strip and a flexible cover portion that overlays the non-adhesive pull tab. A user can manually urge the cover portion away from the pull tab, thereby accessing the pull tab and allowing the user to stretch remove the tape strip from the unitary attachment member and a substrate to which it is adhered.

15 Claims, 5 Drawing Sheets

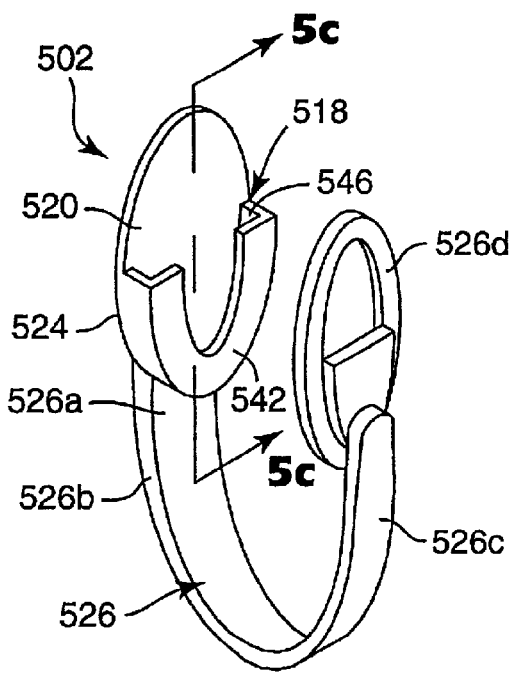
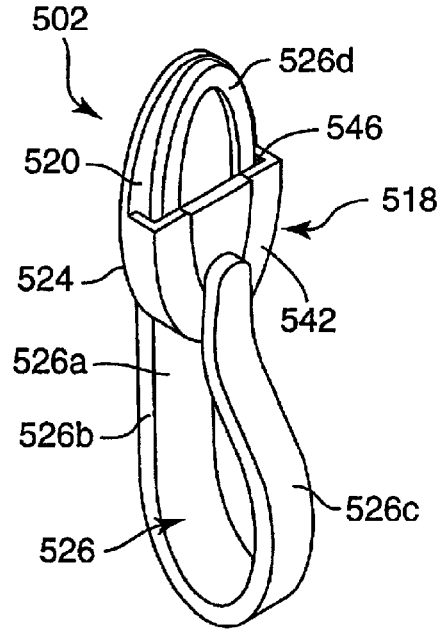
FIG. 5a  FIG. 5b
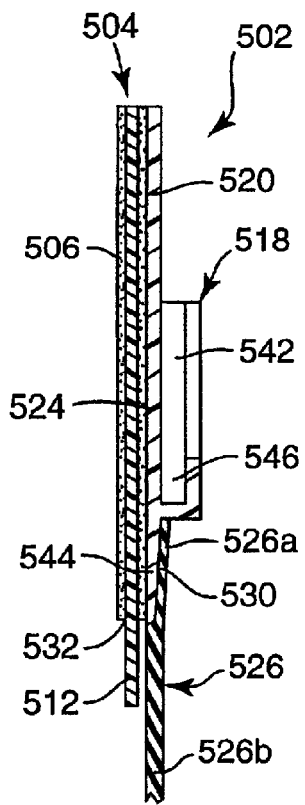
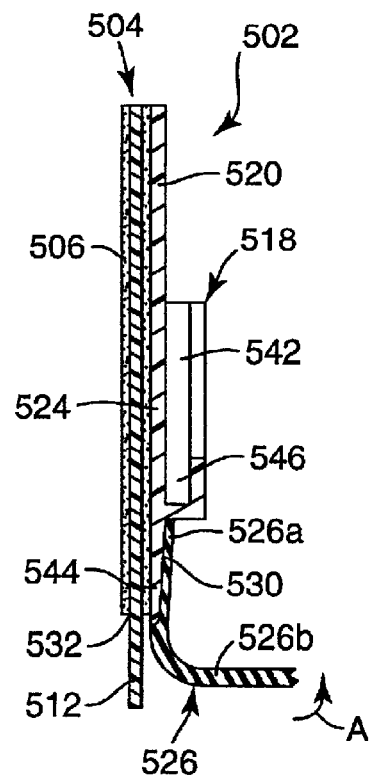
FIG. 5c  FIG. 5d

STRETCH RELEASING ADHESIVE TAPE ARTICLE WITH FLEXIBLE COVER

FIELD OF THE INVENTION

The present invention relates generally to stretch releasing adhesive tapes for removably adhesively bonding an object to a surface. More particularly, the present invention relates to an article for use with a stretch releasing adhesive tape strip that includes a flexible cover portion that can be bent away from the tape strip non-adhesive pull tab to provide access to the pull tab during the removal process.

BACKGROUND OF THE INVENTION

Stretch releasing adhesive tapes represent an emerging class of high performance pressure-sensitive adhesives combining strong holding power with clean removal and no surface damage. Such stretch releasing adhesive tapes are useful in a wide variety of assembling, joining, attaching, and mounting applications.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as strips with one end of the strip including a non-adhesive pull tab to facilitate stretching of the strip during the removal process.

A common use for stretch releasing adhesive tapes is for mounting a holding device, such as a hook, on a surface such as a wall, window, cabinet, or the like. Such holding devices are generally designed to either conceal the non-adhesive pull tab or leave it exposed. Holding devices that leave the pull tab exposed allow a user to directly grasp the pull tab to stretch remove the tape strip from the holding device and the surface. Leaving the pull tab exposed, however, is often considered aesthetically undesirable. Examples of holding devices that leave the non-adhesive pull tab exposed are described in the U.S. patent to Lühmann U.S. Pat. No. 5,409,189 and the U.S. patent to Kreckel U.S. Pat. No. 5,989,708.

To conceal the pull tab and improve the overall visual appearance of the fastening system, holding devices have been designed to completely overlay the pull tab and selectively allow access to the pull tab during the stretch removal process. Examples of holding devices that allow the non-adhesive pull tab to be selectively concealed are described in the U.S. patent to Hamerski et al. U.S. Pat. No. 5,507,464, in the U.S. patent to doCanto et al. U.S. Pat. No. 5,967,474, the U.S. patent to Schumann U.S. Pat. No. 6,082,686, and the U.S. patent to Schumann U.S. Pat. No. 6,131,864. Such devices, however, are expensive to produce and difficult to use.

It would therefore be desirable to provide an article for use with stretch releasing adhesive tape that conceals the non-adhesive pull tab, is inexpensive to produce, and is easy to use.

SUMMARY OF THE INVENTION

The present invention provides an article designed to conceal the non-adhesive pull tab of a stretch releasing adhesive tape strip. More specifically, the present invention provides an article to be used with a stretch releasing adhesive tape strip that has an adhesive portion and a non-adhesive pull tab, wherein the article includes a unitary attachment member having a base plate portion sized to overlay the entire stretch releasing adhesive tape strip.

The base plate portion includes a first portion that overlays the tape strip adhesive portion and a flexible cover portion that overlays the non-adhesive pull tab. In this manner, a user can manually urge and flex the cover portion away from the pull tab, thereby accessing the pull tab and allowing the user to stretch remove the tape strip from the unitary attachment member and the substrate. The flexible portion is sufficiently flexible to allow the user to manually urge the cover portion away from the pull tab, thereby to access the pull tab, without causing the adhesive portion of the tape strip to debond from the substrate or cause the adhesive strip to damage the substrate surface. That is, if the flex force required to flex the cover portion away from the pull tab is excessively high, the adhesive strip will tend to pull away from the substrate and possibly damage the substrate surface.

In one aspect of the invention, the base plate first portion includes generally planar first and second opposed major surfaces and the cover portion includes generally planar first and second opposed major surfaces, and the base plate first portion first major surface and the cover portion first major surface are coplanar, and the base plate first portion second major surface and the cover portion second major surface are coplanar.

In another aspect, the base plate first portion defines a first end portion of the base plate portion extending from adjacent the tape strip pull tab along the tape strip adhesive portion, and the cover portion defines a second end portion of the base plate portion extending from adjacent the tape strip adhesive portion along the tape strip pull tab. In one aspect of the invention, the base plate first portion and the cover portion are formed of the same material.

In another aspect, the base plate first portion is formed of a first material and the cover portion is formed of a second material, and the second material has a flexibility greater than the first material, whereby the cover portion is more flexible than the base plate first portion. The base plate first portion and the cover portion cohere along a connective interface. Alternatively, the base plate first portion and the cover portion may be adhesively bonded or friction fit using a tongue and groove type connection. The portion of the base plate first portion and the portion of the cover portion defining the connective interface do not move relative to each other when the cover portion is moved relative to the base plate first end portion. The connective interface is arranged adjacent the interface between the adhesive portion of the tape strip and the non-adhesive pull tab. In one embodiment, the connective interface defines the beginning of a flex area between the base plate first end portion and the cover portion, and the connective interface is located to allow a user to flex the cover portion away from the pull tab and thereby provide access to the pull tab.

The unitary attachment member includes opposite first and second major surfaces, the first surface being generally planar for adhesive attachment with the tape strip, and preferably includes a holding portion attached to the second major surface. The holding portion may comprise a projection or hook extending outwardly from the second major surface, a pair of opposed cooperating resiliently flexible arcuate jaws extending outwardly from the second major surface, a strap, a surface of mechanically interengaging elements such as hook and loop fasteners, clips, clamps, or other items depending on the intended end use application for the article.

In another embodiment, the base plate first portion defines a first end portion of the base plate portion extending from adjacent the tape strip pull tab along the tape strip adhesive portion, and the cover portion includes a first end portion that overlays at least a portion of and is fixed relative to the base plate first portion and further includes a second end portion that extends from the cover portion first end portion in overlaying relation with the tape strip pull tab. In another aspect, the base plate portion includes a tongue portion extending along the tape strip adhesive portion toward the pull tab, and the cover portion overlays and is coherent with the tongue portion and extends beyond the tongue portion in overlying relation with the pull tab.

In another embodiment, the base plate portion includes first and second opposed major surfaces, and the base plate portion includes a retaining portion extending from the second major surface. In a specific embodiment, the retaining portion is a projection extending outwardly from the base plate portion second major surface, and the cover portion is an elongate strap containing an opening for mating with the projection, thereby to removably connect the cover portion with the projection.

In another embodiment, the cover portion is an elongate strap having a terminal end with an interengaging portion, and the retaining portion is saddle-shaped for receiving the interengaging portion, thereby to maintain the interengaging portion in fixed relation with the base plate portion.

In another aspect, the present invention provides a unitary article for use with a stretch releasing adhesive tape strip having a double-sided adhesive portion and a non-adhesive pull tab, the unitary article comprising a base plate portion sized to overlay the tape strip adhesive portion and the tape strip pull tab, the base plate portion including a first portion overlaying the tape strip adhesive portion and a resiliently flexible cover portion overlaying the non-adhesive pull tab, whereby a user can manually urge the cover portion away from the pull tab to access the pull tab, thereby allowing the user to stretch remove the tape strip from the article and the substrate.

In a specific embodiment, the invention provides a stretch releasing adhesive tape article to be mounted on a substrate comprising a stretch releasing adhesive tape strip having an adhesive portion and a non-adhesive pull tab, and a unitary attachment member including a base plate portion sized to overlay the tape strip. The base plate portion includes a stiff first portion overlaying the tape strip adhesive portion, the stiff first portion defining a first end portion of the base plate portion extending from adjacent the tape strip pull tab along the tape strip adhesive portion, the stiff first portion having first and second opposed major surfaces and including a tongue portion adjacent the pull tab, a cover portion, the cover portion being formed of a material more flexible than the stiff first portion. The cover portion includes a first end portion overlaying and fixed relative to the base plate tongue portion, a second portion extending from the cover portion first end portion in overlaying relation with the tape strip pull tab, an elongate strap portion extending from the second portion, thereby allowing a user to manually urge the strap portion away from the pull tab to access the pull tab and stretch remove the tape strip from the unitary attachment member and the substrate, and an interengaging end portion extending from the strap portion. The base plate portion also includes a saddle shaped retaining portion extending outwardly from the stiff first portion second major surface for receiving the interengaging portion, thereby to maintain the interengaging portion in fixed relation with the base plate portion.

BRIEF DESCRIPTION OF THE DRAWINGS

The present invention will be further described with reference to the accompanying drawings, in which:

FIG. 1b is a sectional view taken along line 1b–1b of FIG. 1a;

FIG. 2b is a sectional view taken along line 2b–2b of FIG. 2a;

FIG. 3b is a sectional view taken along line 3b–3b of FIG. 3a;

FIG. 4c is a sectional view taken along line 4c–4c of FIG. 4a;

FIG. 5a is a perspective view of another embodiment of the invention;

FIG. 5b is a perspective view of the adhesive tape article of FIG. 5a in its holding condition;

FIG. 5c is a sectional view taken along line 5c–5c of FIG. 5a;

Figure 6A:
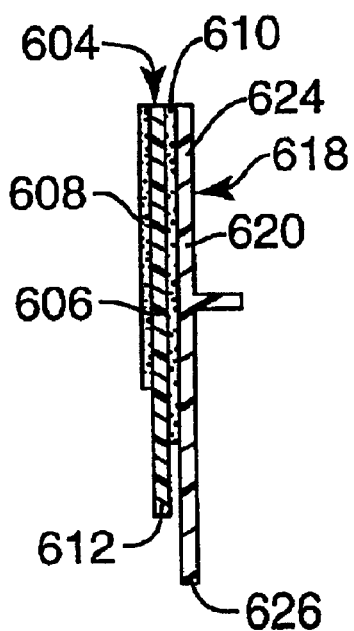

Fib. 5d is a sectional side view with the cover flexed to expose the non adhesive pull tab;

FIG. 6a is a sectional view showing an additional feature of the invention; and

Figure 6B:
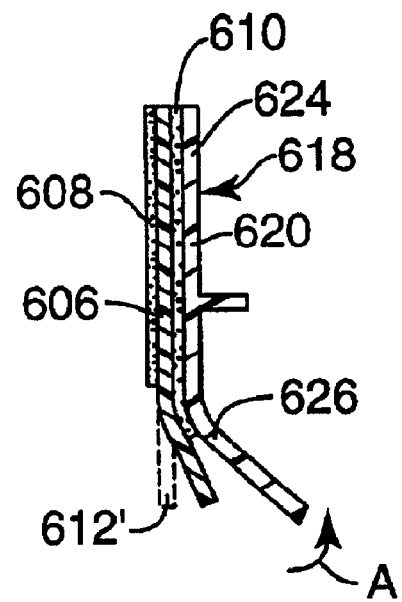

FIG. 6b is a sectional view as in FIG. 6a with the cover portion positioned to expose the pull tab.

DETAILED DESCRIPTION

Figure 1A:
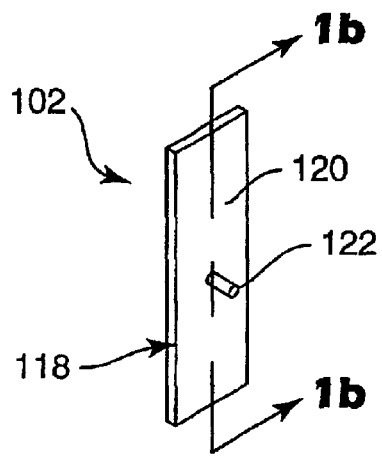
FIG. 1a is a perspective view of a stretch releasing adhesive tape article according to the invention.
Figure 1B:
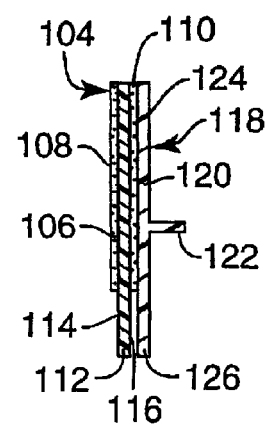
Figure 1C:
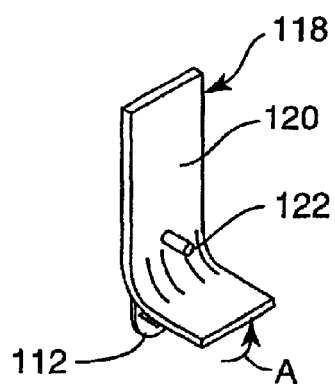
FIG. 1c is a perspective view of the adhesive tape article of FIG. 1a with the non adhesive pull tab exposed.

Referring now to the Figures, and first to FIGS. 1a–1c, there is shown a stretch releasing adhesive tape article 102 with a stretch releasing adhesive tape strip 104 for adhesively bonding the article 102 to a substrate such as a wall, cabinet, or the like (not shown).

The stretch releasing adhesive tape strip 104 includes an adhesive portion 106 having opposed adhesive first and second major surfaces 108, 110, and a non-adhesive pull tab 112 having opposed non-adhesive first and second major surfaces 114, 116 that provide means for a user to grasp and stretch the tape strip 104 during the removal process.

The stretch releasing adhesive tape 104 can be any pressure-sensitive adhesive tape that can be adhered firmly to a substrate and thereafter removed there from by stretching. Such pressure sensitive adhesive tapes can include an elastic backing, a highly extensible and substantially inelastic backing, or can be a tape formed of a solid, elastic pressure sensitive adhesive.

Suitable stretch releasing tapes are described in U.S. Pat. No. 4,024,312 (Korpman), German Patent No. 33 31 016, U.S. Pat. No. 5,516,581 (Kreckel et al.), and PCT International Publication No. WO 95/06691 (Bries et al). In addition, the stretch releasing adhesive tape can include a splittable layer such as the layers described in U.S. Pat. No. 6,004,642, or a re-fastenable layer such as the layers described in PCT International Publication No. WO 99/31193.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as discrete strips with one end of the strip including a non-adhesive pull tab to facilitate stretching of the strip during removal. The adhesive surfaces of the strip may additionally be protected with a release liner (not shown).

A unitary attachment member 118 includes a base plate portion 120 sized to overlay the tape strip 104 and a holding portion 122 in the form of a projection extending outwardly from the surface of the base plate portion 120 opposite the tape strip 104. The base plate portion 120 includes a first portion 124 defining a first end portion of the base plate portion 120 that extends from adjacent the tape strip non-adhesive pull tab 112 along the tape strip adhesive surface 110, and a cover portion 126 defining a second end portion of the base plate portion 120 that extends from adjacent the tape strip adhesive surface 110 along the tape strip non-adhesive pull tab 112.

In accordance with a characterizing feature of the invention, the base plate portion 120 is formed of a flexible material, and preferably a resiliently flexible material, such as an elastomer that allows a user to manually flex the cover portion 126 away from the non-adhesive pull tab 112 as shown by arrow A (FIG. 1c) to expose the pull tab 112, and thereby allow the user to stretch remove the tape strip 104 from the unitary attachment member 118 and the substrate to which it is adhered. In each embodiment of the invention described herein, a base plate includes a flexible cover portion that can be manually urged away from the non-adhesive pull tab as indicated by the letter A, thereby to expose the pull tab and allow a user to stretch remove the tape strip from the substrate and the unitary attachment member to which it is adhered.

Figure 2A:
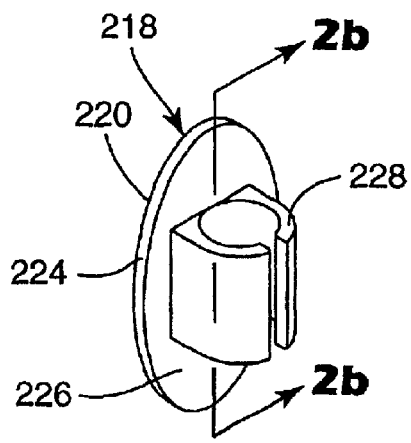
FIG. 2a is a perspective view of another embodiment of the invention.
Figure 2B:
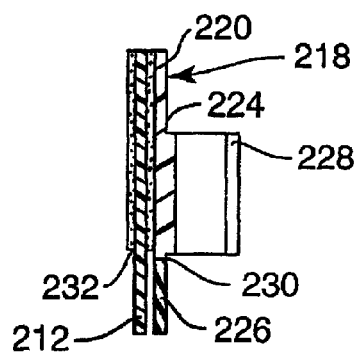
Figure 2C:
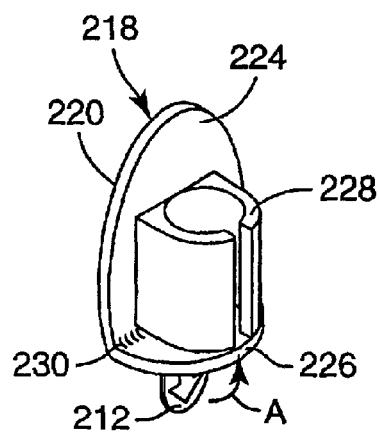
FIG. 2c is a perspective view of the adhesive tape article of FIG. 2a with the non adhesive pull tab exposed.

FIGS. 2a–2c show another embodiment of the invention in which the base plate portion 220 of the unitary attachment member 218 is formed of two different materials. Features in FIGS. 2a–2c, and the remaining FIGS. 3–5, that are functionally similar to those of FIGS. 1a–1c are shown with like reference numerals incremented by 100. In accordance with another characterizing feature of the invention, the first portion 224 of the base plate portion 220 is formed of a stiff material and the cover portion 226 of the base plate portion 220 is formed of a flexible material, thereby allowing the cover portion to be flexed away from the non-adhesive pull tab 212.

Suitable stiff materials include polypropylene, polystyrene, polycarbonate, acrylonitrile butadiene styrene polymers, nylon, unplasticized polyvinyl chloride. Suitable flexible materials include thermoplastic elastomers and elastomeric materials such as natural rubber, styrene-butadiene copolymer, neoprene, and nitrile rubber.

The base plate portion 220 is preferably formed using a two shot molding process in which the first portion 224 or the base plate portion 220 and the cover portion 226 are combined to form a unitary article. Alternatively, the base plate portion 220 and cover portion 226 may be adhesively bonded using a suitable adhesive.

Since certain materials do not bond well when molded together, material selection for the first portion 224 and cover portion 226 is important. To ensure that the base plate portion 220 has adequate cohesive strength, certain material combinations that form strong bonds are preferred. For example, an effective material combination is VERSAFLEX thermoplastic elastomer available from GLS Corporation, McHenry, Ill., for the stiff material, and nylon for the flexible material. In another example, the stiff material is KRATON thermoplastic elastomer available from Shell Oil Company, Houston Tex., and the flexible material is polypropylene. In a preferred embodiment, the stiff material is SANTOPRENE thermoplastic rubber available from Advanced Elastomer Systems, Akron, Ohio, and the flexible material is high impact polystyrene.

The unitary attachment member 218 also includes a wire holding portion 228 formed by a pair of opposed cooperating resiliently flexible arcuate jaws extending outwardly from the first portion 224 of the base plate portion 220. While the wire holding portion 228 is shown extending from the first portion 224, it will be recognized that the holding portion 228 may also extend outwardly from the cover portion 226. In addition, the holding portion 228 may be formed of the same flexible material as the cover portion 226.

The first portion 224 and cover portion 226 are coherently joined at a connective interface 230 adjacent the interface 232 between the tape strip adhesive portion 206 and the pull tab 212 that defines the flex region between the first portion 224 and the cover portion 226. At the connective interface 230, the first portion 224 and the cover portion 226 do not move relative to each other when the cover portion 226 is moved relative to the first portion 224.

Figure 3A:
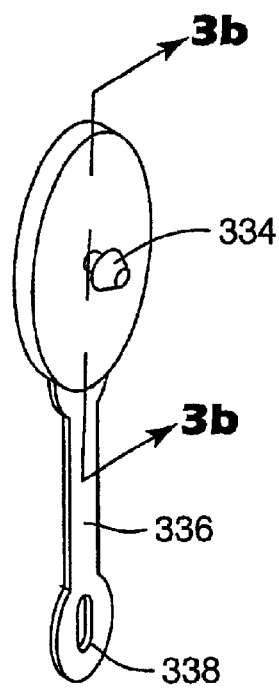
FIG. 3a is a perspective view of another embodiment of the invention.
Figure 3B:
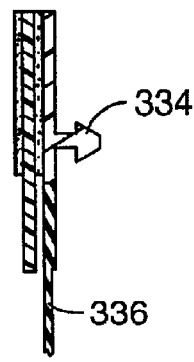
Figure 3C:
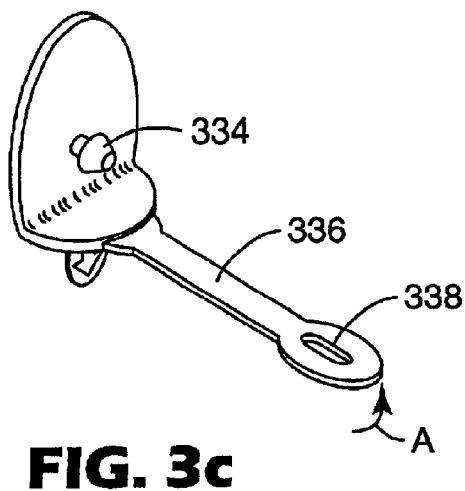
FIG. 3c is a perspective view of the adhesive tape article of FIG. 3a with the non adhesive pull tab exposed.
Figure 3D:
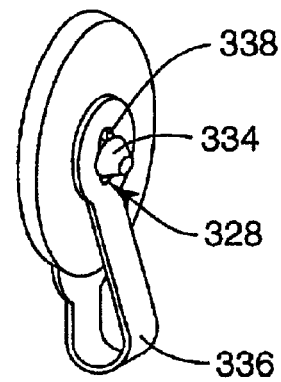
FIG. 3d is a perspective view of the adhesive tape article of FIG. 3a in its holding condition.
Figure 4A:
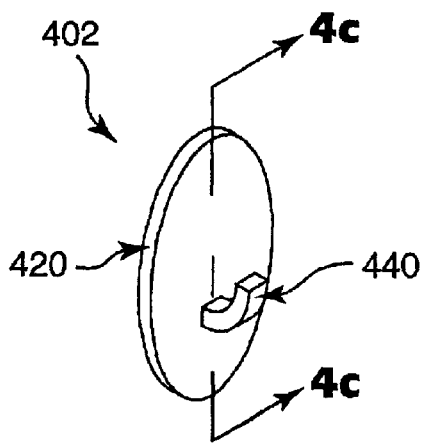
FIG. 4a is a perspective view of another embodiment of the invention.
Figure 4B:
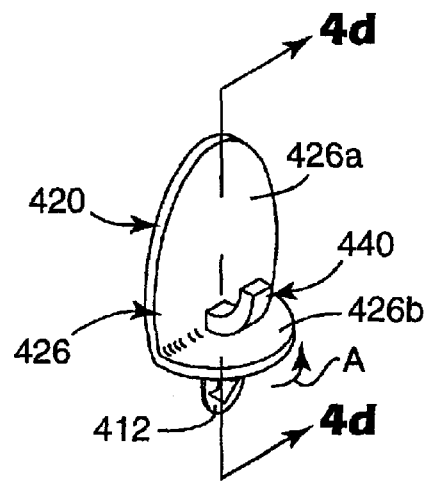
FIG. 4b is a perspective view of the adhesive tape article of FIG. 4a with the non adhesive pull tab exposed.
Figure 4C:
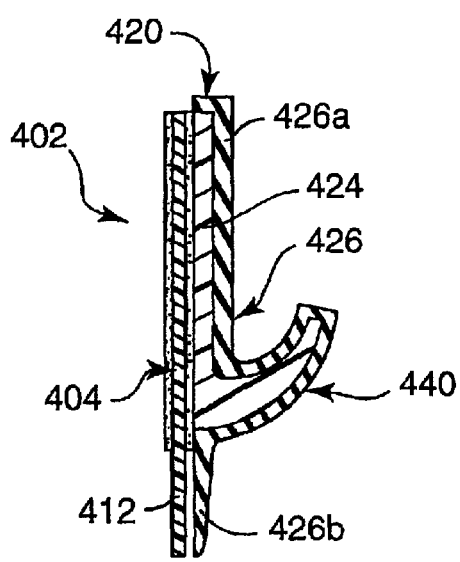
Figure 4D:
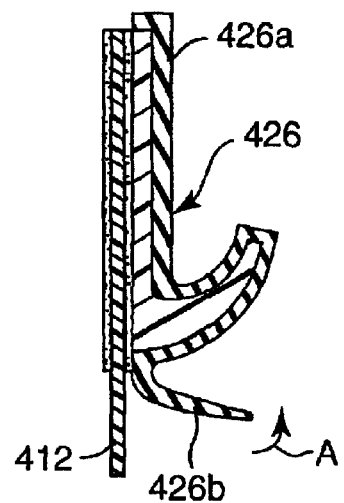
FIG. 4d is a sectional view taken along line 4d–4d of FIG. 4b.

FIGS. 3a–3d show an article similar to the one described in FIGS. 2a–2c except the holding portion 328 in FIGS. 3a–3c includes a peg 334 and a cooperating bundling strap 336. The end of the bundling strap 336 contains an opening 338 that fits over the peg 334 and can be secured thereto, thereby allowing the bundling strap 336 to form a closed loop for holding wires, cables, or the like.

FIGS. 4a–4d show an article 402 including a base plate portion 420 and a hook portion 440 extending outwardly from the base plate portion 420 opposite the tape strip 404. The base plate portion 420 includes a first portion 424 and a cover portion 426 that completely overlays and is fixed to the base plate first portion 424. The cover portion 426 includes a first end portion 426a that overlays the base plate first portion 424 and includes a second end portion 426b that extends from the cover portion first end portion 426a and overlays the pull tab 412. The cover portion 426 second end portion 426b is thickest adjacent the hook portion 440 and tapers along the length of the pull tab 412.

FIGS. 5a–5d show a stretch releasing adhesive tape article 502 including a stretch releasing adhesive tape strip 504 and a unitary attachment member 518. The adhesive tape strip 504 includes an adhesive portion 506 and a non-adhesive pull tab portion 512. The unitary attachment member 518 includes a base plate portion 520 including a stiff first portion 524, a flexible cover portion 526, and a saddle shaped retaining portion 542.

The stiff first portion 524 overlays the tape strip adhesive portion 506 and includes a tongue portion 544 that terminates adjacent the pull tab portion 512. The base plate first portion 524 defines a first end portion of the base plate portion 520 that extends from adjacent the tape strip pull tab 512 along the tape strip adhesive portion 506.

The cover portion 526 includes a first end portion 526a that overlays and is fixed to the tongue portion 544, a second portion 526b that extends from the cover portion first end portion 526a in overlaying relation with the tape strip pull tab 512, an elongate strap portion 526c that extends from the second portion 526b, and an interengaging end portion 526d that extends from the elongate strap portion 526c. The cover portion 526 can be bent away from the non-adhesive pull tab 512 to provide access to the pull tab 512 as shown in FIG. 5d, thereby to allow a user to stretch remove the tape strip 504 from the substrate and the unitary attachment member 518 to which the adhesive strip 504 is adhesively bonded. The interengaging end portion 526d may be formed of the same stiff material as the base portion 520 or the same flexible material as the elongate strap potion 526c.

The saddle shaped retaining portion 542 extends outwardly from the base plate first portion 524 opposite the tape strip 504 and includes a slot 546 that slidably receives the interengaging end portion 526d of the cover portion 526, thereby retaining the interengaging end portion 526d in fixed relation with the base plate first portion 524 to form a closed loop therewith that can be used to support wires, cables, or the like as shown in FIG. 5b, which is referred to as the holding condition of the article.

The region where the tongue portion 544 and the cover portion 526 overlap and are coherently joined forms a connective interface 530. The connective interface 530 is adjacent the interface 532 between the tape strip adhesive portion 506 and the pull tab 512, and defines the beginning of a flex region where the cover portion 526 flexes relative to the tongue portion 544. At the connective interface 530, the cover portion first end portion 526a and tongue portion 544 do not move relative to each other when the cover portion 526 is moved relative to the first portion 524.

FIGS. 6a and 6b show an additional feature of the invention that may be included in the embodiments of FIGS. 1–5. In accordance with the feature, the adhesive strip 604 includes an adhesive portion 606 having a first adhesive surface 608 and a second opposed major adhesive surface 610 that extends in the direction of the pull tab 612 farther than the first adhesive surface 608. The unitary attachment member 618 base plate portion 620 includes a first portion 624 and a flexible cover portion 626. The first portion 624 and the end of the cover portion 626 adjacent the first portion 624 are adhered to the adhesive second surface 610. In this manner, as a user urges the cover portion 624 away from the pull tab 612 during the removal process as shown by the letter A in FIG. 6b to access the pull tab, the pull tab 612 is moved away from its original position 612 adjacent the substrate as shown in phantom in FIG. 6b to its flexed position 612', thereby allowing the user to more easily access the pull tab 612.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An article to be mounted on a substrate using a stretch releasing adhesive tape strip having an adhesive portion and a non-adhesive pull tab, said article comprising a unitary attachment member including a base plate portion sized to overlay said tape strip, said base plate portion including a first portion overlaying said tape strip adhesive portion and a flexible cover portion overlaying said tape strip non-adhesive pull tab, wherein a user can manually urge said cover portion away from said pull tab to access said pull tab, thereby allowing the user to stretch remove said tape strip from said unitary attachment member and the substrate, wherein said base plate first portion is formed of a first material and said cover portion is formed of a second material.

2. An article as defined in claim 1, wherein said first material comprises as least one of polypropylene and polystyrene.

3. An article as defined in claim 2, wherein said second material is an elastomer.

4. An article as defined in claim 1, wherein said base plate first portion said cover portion cohere along a connective interface.

5. An article as defined in claim 1, wherein said base plate first portion said cover portion are adhesively bonded along a connective interface.

6. An article as defined in claim 5, wherein said first and said second material forming said connective interface between said base plate first end portion and said cover portion do not move relative to each other when said cover portion is moved relative to said base plate first end portion.

7. An article as defined in claim 6, wherein said connective interface is arranged adjacent the interface between said adhesive portion of said tape strip and said non-adhesive pull tab.

8. An article as defined in claim 5, wherein said connective interface defines the beginning of a flex area between said base plate first end portion and said cover portion, and further wherein said connective interface is located in a region of said tape strip to allow a user to flex said cover portion away from said pull tab and thereby provide access to said pull tab.

9. An article to be mounted on a substrate using a stretch releasing adhesive tape strip having an adhesive portion and a non-adhesive pull tab, said article comprising a unitary attachment member including a base plate portion sized to overlay said tape strip, said base plate portion including a first portion overlaying said tape strip adhesive portion and a flexible cover portion overlaying said tape strip non-adhesive pull tab, wherein a user can manually urge said cover portion away from said pull tab to access said pull tab, thereby allowing the user to stretch remove said tape strip from said unitary attachment member and the substrate, wherein said unitary attachment member includes opposite first and second major surfaces, said first surface being generally planar for adhesive attachment with said tape strip, and further wherein said unitary attachment member includes a holding portion extending outwardly from said second major surface.

10. An article as defined in claim 9, wherein said holding portion comprises a hook extending outwardly from said second major surface.

11. An article at defined in claim 9, wherein said holding portion comprises a pair of opposed cooperating resiliently flexible arcuate jaws extending outwardly from said second major surface.

12. A stretch releasing adhesive tape article to be mounted on a substrate, comprising:

(a) a stretch releasing adhesive tape strip having an adhesive portion and a non-adhesive, pull tab; and
(b) a unitary attachment member including:
　(I) a base plate portion sized to overlay said tape strip, said base plate portion including:
　　(1) a first portion defining a first end portion of said base plate portion that extends from adjacent said tape strip pull tab along said tape strip adhesive portion and;
　　(2) a resiliently flexible cover portion defining a second end portion of said base plate portion extending from adjacent said tape strip adhesive portion along said tape strip pull tab;
　　wherein said base plate first portion includes generally planar first and second opposed major surfaces and said cover portion includes generally planar first and second opposed major surfaces, said base plate first portion first major surface and said cover portion first major surface being coplanar, and said base plate first portion second major surface and said cover portion second major surface being coplanar, and
　　further wherein said base plate first portion is formed of a first material and said cover portion is formed of a second material, said second material having a flexibility greater than said first material, and said base plate first portion and said cover portion cohere along a connective interface, and
　(ii) a holding portion extending outwardly from said second major surface for supporting an item to be mounted on the substrate;
wherein a user can manually urge said cover portion away from said pull tab to access said pull tab, thereby allowing the user to stretch remove said tape strip from said unitary attachment member and the substrate.

13. A stretch releasing adhesive tape article as defined in claim 12, wherein said adhesive tape strip includes first and second ends, said tape strip adhesive portion being provided adjacent said tape strip first end and said pull tab being provided adjacent said tape strip second end, further wherein said tape strip adhesive portion includes first and second opposed adhesive major surfaces each having primary ends adjacent said tape strip first end and secondary ends adjacent said pull tab, wherein said second adhesive surface secondary and is arranged closer to said tape strip second end than said first adhesive surface secondary end and said second adhesive surface adhesively bonds to said base plate first portion and a portion of said flexible cover portion adjacent said base plate first portion, whereby when said cover portion is urged away from said tape strip to access said pull tab, said pull tab flexes away from the substrate, thereby facilitating access to the pull tab.

14. A stretch releasing adhesive rape article to be mounted on a substrate, comprising:
(a) a stretch releasing adhesive tape strip having an adhesive portion and a non-adhesive pull tab; and
(b) a unitary attachment member including a base plate portion sized to overlay said tape strip, said base plate portion including:
　(i) a stiff first portion overlaying said tape strip adhesive portion, said stiff first portion defining a first end portion of said base plate portion extending from adjacent said tape strip pull tab along said tape strip adhesive portion, said stiff first portion having first and second opposed major surfaces and including a tongue portion adjacent said pull tab;
　(ii) a cover portion, said cover portion being formed of a material more flexible than said stiff first portion, said cover portion including
　　(A) a first end portion overlaying and fixed relative to said base plate tongue portion;
　　(B) a second portion extending from said cover portion first end portion in overlaying relation with said tape strip pull tab, whereby a user can manually urge said second portion away from said pull tab to access said pull tab and stretch remove said tape strip from said unitary attachment member and the substrate;
　　(C) an elongate strap portion extending from said second portion; and
　　(D) an interengaging end portion extending from said strap portion; and
　(iii) a saddle shaped retaining portion extending outwardly from said stiff first portion second major surface for receiving said interengaging portion, thereby to maintain said interengaging portion in fixed relation with said base plate portion.

15. An article as defined in claim 1, wherein said second material has a flexibility greater than said first material.

\* \* \* \* \*

UNITED STATES PATENT AND TRADEMARK OFFICE
CERTIFICATE OF CORRECTION

PATENT NO. : 6,811,126 B2
DATED : November 2, 2004
INVENTOR(S) : Johansson, Ronald C.

It is certified that error appears in the above-identified patent and that said Letters Patent is hereby corrected as shown below:

Column 8,
Line 62, delete "at", insert in place thereof -- as --;

Column 9,
Line 45, delete "and", insert in place thereof -- end --;

Column 10,
Line 8, delete "rape", insert in place thereof -- tape --.

Signed and Sealed this

Nineteenth Day of April, 2005

JON W. DUDAS
*Director of the United States Patent and Trademark Office*